(12) United States Patent
Ano et al.

(10) Patent No.: US 7,404,650 B2
(45) Date of Patent: Jul. 29, 2008

(54) STRUCTURAL BOARD

(75) Inventors: Kazutaka Ano, Saitama (JP); Kaoru Aoyagi, Saitama (JP); Naoto Ishii, Saitama (JP); Yasuyuki Tamane, Saitama (JP); Mitsuhiro Nishizaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/375,135

(22) Filed: Mar. 15, 2006

(65) Prior Publication Data

US 2006/0209546 A1 Sep. 21, 2006

(30) Foreign Application Priority Data

Mar. 16, 2005 (JP) ............................. 2005-074671

(51) Int. Cl.
*F21S 8/00* (2006.01)
(52) U.S. Cl. ........................ 362/145; 362/146; 362/147; 362/153; 362/153.1
(58) Field of Classification Search ......... 362/127–134, 362/153, 153.1, 146–147, 602–607, 330, 362/367, 611–612, 608, 610, 240; 52/173.3, 52/171.3, 783.17, 783.18, 793.1, 789.1, 173.1, 52/28; 40/544, 546–547; 108/23
See application file for complete search history.

(56) References Cited

U.S. PATENT DOCUMENTS

| | | | | | |
|---|---|---|---|---|---|
| 2,831,688 | A | * | 4/1958 | Knox ........................... | 482/30 |
| 4,167,598 | A | * | 9/1979 | Logan et al. ................ | 428/34.1 |
| 5,031,083 | A | * | 7/1991 | Claesson ..................... | 362/249 |
| 5,961,072 | A | * | 10/1999 | Bodle ....................... | 244/118.5 |
| 6,074,074 | A | * | 6/2000 | Marcus ....................... | 362/240 |
| 6,739,735 | B2 | * | 5/2004 | Talamo et al. ................ | 362/249 |
| 7,043,881 | B2 | * | 5/2006 | Krause et al. ............... | 52/171.3 |
| 2003/0137839 | A1 | * | 7/2003 | Lin ............................. | 362/249 |

FOREIGN PATENT DOCUMENTS

| | | |
|---|---|---|
| CN | 2608602 Y | 3/2004 |
| DE | 20 2004 000 810 U1 | 5/2004 |
| EP | 0 744 514 A1 | 11/1996 |
| FR | 2 325 503 A | 4/1977 |
| JP | 05-272227 | 10/1993 |
| JP | 2000-326430 A | 11/2000 |

* cited by examiner

*Primary Examiner*—Jong-Suk (James) Lee
*Assistant Examiner*—Robert May
(74) *Attorney, Agent, or Firm*—Arent Fox LLP.

(57) ABSTRACT

A structural board includes a pair of intermediate members having plural projections. The intermediate members are positioned in parallel, and the projections are in contact with each other between the intermediate members. At least one of the intermediate members are light permeable. An illuminator is provided between the intermediate members.

4 Claims, 5 Drawing Sheets

STRUCTURAL BOARD

Priority is claimed on Japanese Patent Application No. 2005-074671, filed Mar. 16, 2005, the content of which is incorporated herein by reference.

BACKGROUND OF THE INVENTION

1. Field of the Invention

The present invention relates to structural boards with so-called honeycomb structure, and in particular, relates to structural boards used, for example, in vehicles such as automobiles, trains, and airplanes, and in the interiors of buildings.

2. Description of Related Art

Conventionally, as floor structures of office buildings, free-access floors are well known. A free-access floor has multiple pillars positioned in grids on a concrete floor, and a number of flat square panel members of which the four corners thereof are supported by the pillars (for example, see Patent Document 1 below).

The floor member is made of a pure material of low-weight concrete, steel, or plastic. On surfaces of the floor members, finishing members, such as carpets, vinyl tiles, and flooring boards, are placed. The surfaces of the floors are illuminated by fluorescent or incandescent lights at the ceiling.

According to the free-access floors, without degradation of appearances, office equipment and desks can be easily rearranged.

Patent Document 1: Japanese Unexamined Patent Application, First Publication No. 5-272227

There has been a problem in that when panel members which are designed for the above-mentioned floor structures are used in automobiles and trains, the panel members which are made of pure materials are heavy, and this therefore increases fuel consumption. There has also been a problem in that when the panel members are made thinner in order to reduce fuel consumption, rigidity in trains is not sufficient.

There was a problem in that even with illumination from the ceiling, the feet of passengers were dimly illuminated because of shadows. Even when a passenger dropped something on the floor, it was difficult to find it. Since light from the outside a vehicle is insufficient at night, a similar problem occurs.

SUMMARY OF THE INVENTION

The present invention solves the above problems, and it is an object of the present invention to provide a structural board which can illuminate the floors brightly and which can also reduce the weight thereof and can increase the rigidity thereof.

In the first aspect of the present invention, a structural board includes: a pair of intermediate members having plural projections, the intermediate members being positioned in parallel, the projections being in contact with each other between the intermediate members, at least one of the intermediate members being light permeable; and an illuminator provided between the intermediate members.

According to the first aspect of the present invention, because the intermediate members are formed with a honeycomb structure of a base member and projections which reduce its weight, and because combinations of the intermediate members of the honeycomb structure increase its rigidity, the high rigidity and low weight of the honeycomb structure structural board are achieved.

The light from the illuminator is transmitted through the intermediate members which are light permeable, and the light exits from the honeycomb structure structural board. Therefore, when the honeycomb structure structural board is used as the floor of a train, the feet of passengers are more brightly lit than by illumination from the ceiling.

The light from the illuminator is refracted, reflected, and dispersed by the projections, then is transmitted through the base member, and then exits the honeycomb structure structural board. Therefore, appearance of the honeycomb structure structural board is improved, and its design value is enhanced.

In the second aspect of the present invention, in the structural board according to the first aspect of the present invention, at least one of the intermediate members includes an uneven core member and a flat surface member which covers a surface of the core member.

According to the second aspect of the present invention, because the intermediate members are formed by covering the surfaces of the uneven core members with the flat surface members, a number of airtight spaces are provided between the recessed portions of the core members and the surface members, thereby improving strength against external forces and thermal insulation.

In the third aspect of the present invention, in the structural board according to the second aspect of the present invention, the core member is made of a low-weight rigid plastic, and the surface member is a punched metal plate.

According to the third aspect of the present invention, because the surface member of the intermediate member is the punched metal plate, resistance to shock and abrasion are improved.

In the fourth aspect of the present invention, in a structural board according to the second aspect of the present invention, the core member is made of low-weight rigid plastic, and the surface member is made of plastic.

According to the fourth aspect of the present invention, because the core member is made of low-weight plastic with high rigidity and the surface member is made of plastic, the weight of the structural board can be reduced.

In the fifth aspect of the present invention, in the structural board according to the second aspect of the present invention, the core member is made of low-weight plastic with high rigidity and the surface member is made of glass.

According to the fifth aspect of the present invention, because the surface member is made of glass, light penetration ability is improved, and the brightness of the structural board is increased.

In the sixth aspect of the present invention, in the structural board according to the first aspect of the present invention, a structural board further includes a controller for controlling at least one of a color, brightness, time, and an on-off interval of light from the illuminator.

According to the sixth aspect of the present invention, when the structural board is applied to a floor of a building, in case of fire, the location of an emergency exit and a direction of evacuation can be reliably shown. When a fire occurs, smoke from the fire moves along ceilings, and therefore people in rooms and passages cannot see guide lights, and have to crawl on the floor toward the exit. In this situation, by changes in the color, the brightness, the illumination duration, and the illumination on-off interval of the illuminator, the location of the emergency exit and the direction of evacuation can be shown, and people can be guided to the emergency exit.

When the structural board is used for a floor of a train, information regarding operations of the train can be shown. By changes in color, brightness, illumination duration, and illumination on-off interval of the entire floor, the actions of the train, such as acceleration, deceleration, and stopping, may be conveyed. Therefore, the passengers can have appropriate postures depending on the actions. By the illumination of the floor corresponding to the doors which will be opened at the next stop, the passengers can know which doors will be opened at the stops, and can smoothly get off.

According to the present invention, because the intermediate members are formed with a honeycomb structure in a base member and projections which reduce its weight, and because combinations of the intermediate members of the honeycomb structure increases its rigidity, the high rigidity and low weight of the honeycomb structure structural board are achieved.

Because the intermediate members are formed by covering the surfaces of the uneven core members with the flat surface members, a number of airtight spaces are provided between the recessed portions of the core members and the surface members, thereby improving strength against external forces and thermal insulation.

The light from the illuminator is refracted, reflected, and dispersed by the projections, is then transmitted through the base member, and then exits the honeycomb structure structural board. Therefore, the appearance of the honeycomb structure structural board is improved, and its design value is enhanced.

DETAILED DESCRIPTION OF THE INVENTION

The embodiments of the present invention will be described below with reference to the drawings. The same reference numbers are employed to designate like parts, and repeated detailed description thereof is omitted.

First Embodiment

Figure 1:
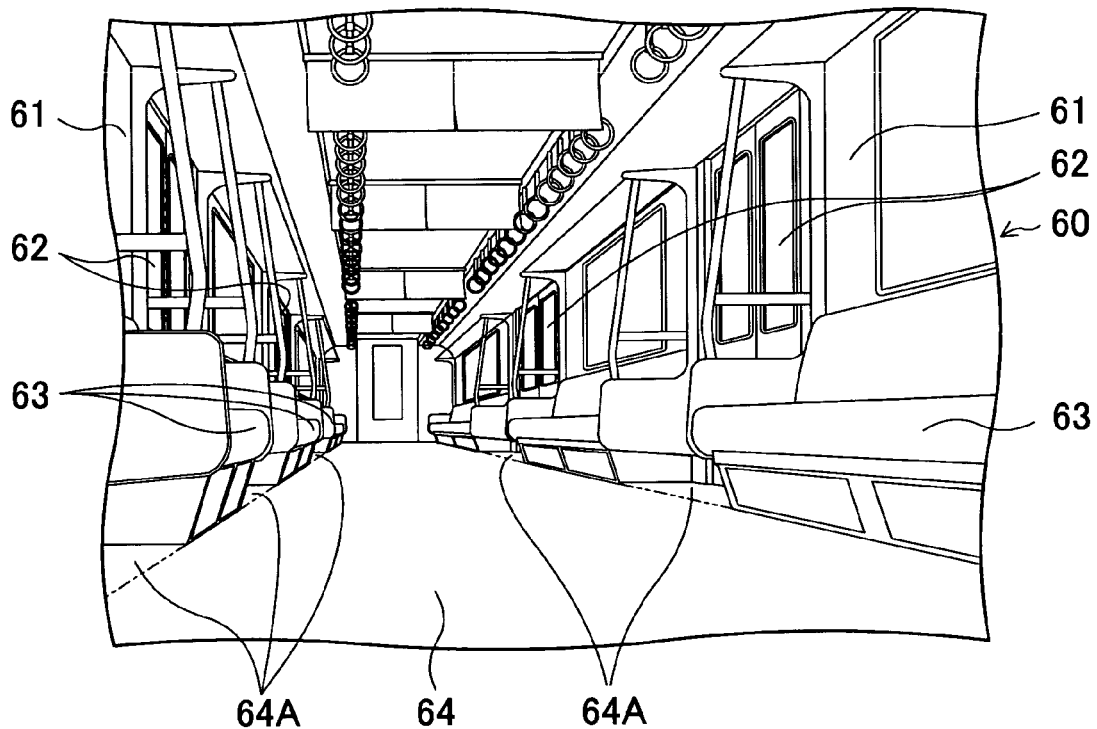
FIG. 1 is a perspective view showing an interior of a train in which a structural board of a first embodiment of the present invention is applied.

FIG. 1 shows a perspective view of an interior of a train 60 with a honeycomb structure structural board 1 according to the first embodiment.

In the train 60, doors 62 are provided at predetermined intervals along both side walls 61. Bench seats 63 are provided between the doors 62. A floor 64 of the train 60 is constituted of a number of honeycomb structure structural boards 1.

Figure 2:
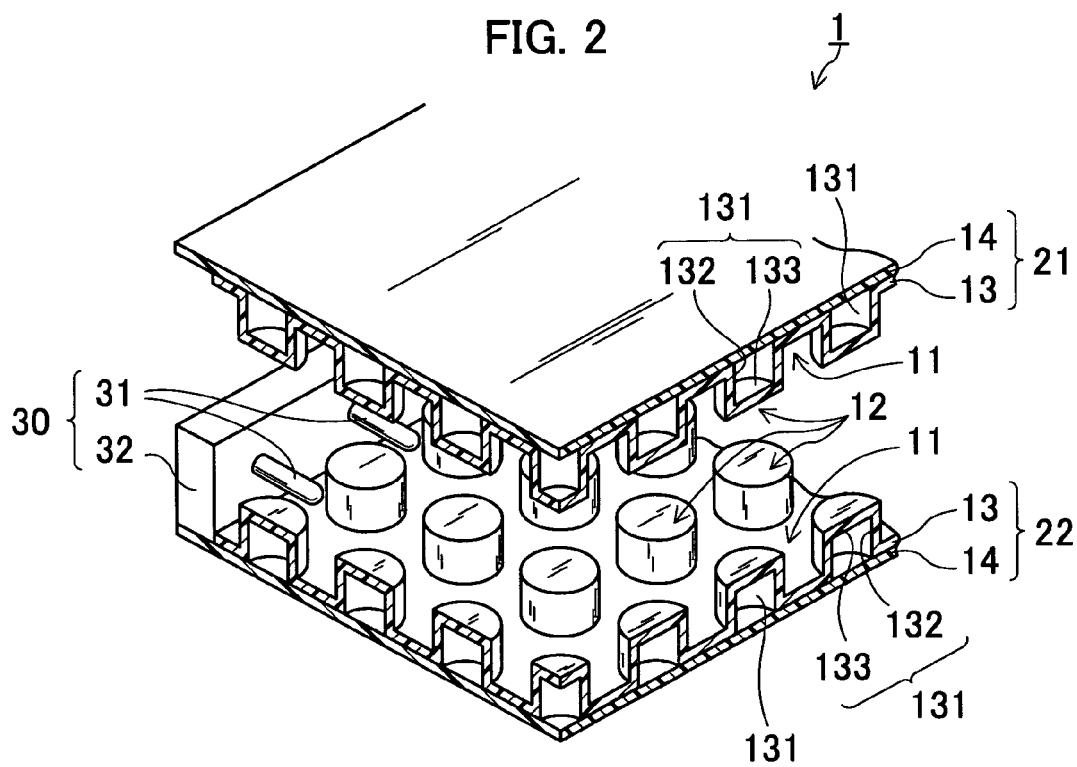
FIG. 2 is an exploded view showing the structural board of the first embodiment of the present invention.

FIG. 2 is an exploded view showing the honeycomb structure structural board 1 according to the first embodiment.

Figure 3:
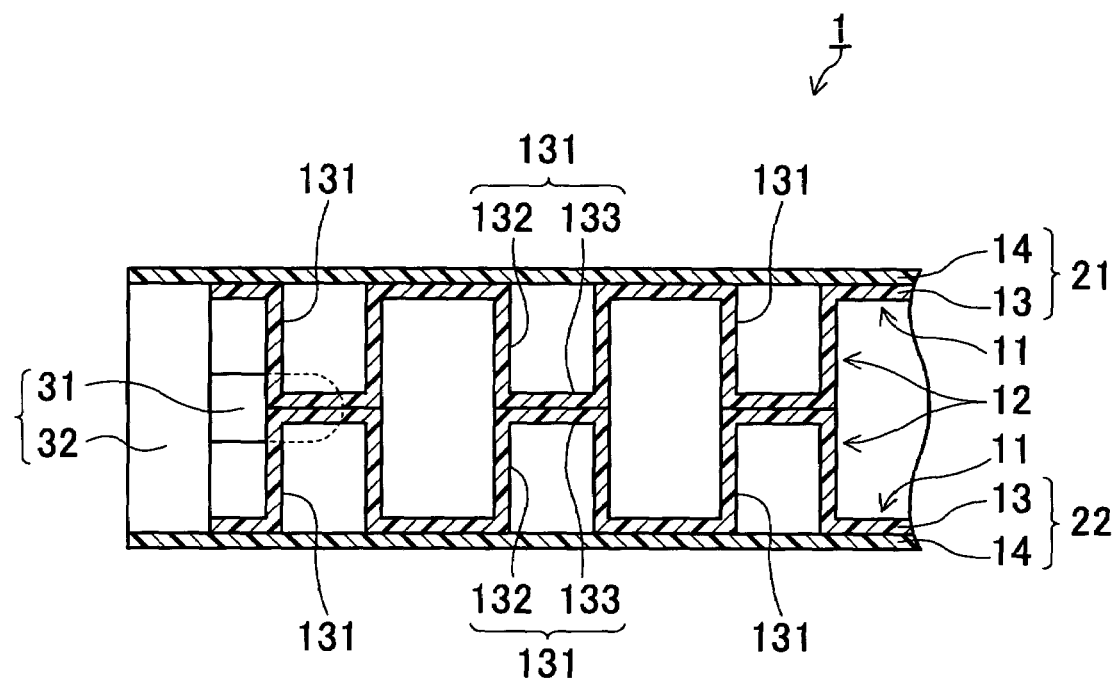
FIG. 3 is a cross-sectional view of the structural board of the first embodiment of the present invention.

FIG. 3 is a cross-sectional view of the honeycomb structure structural board 1.

The honeycomb structure structural board 1 includes a pair of intermediate members 21 and 22 which are positioned in parallel, and an illuminator 30 for illuminating a space between the pair of intermediate members 21 and 22.

Each of the intermediate members 21 and 22 has a plate-shaped base member 11, and a number of hollow projections 12 formed on one side of the base member 11. The intermediate members 21 and 22 are positioned in parallel so that the projections 12 are in contact with each other.

The intermediate members 21 and 22 are formed by covering uneven core members 13 with flat surface members 14.

That is, a number of recessed portions 131 are formed with the core members 13. The recessed portions 131 form cylindrical wall portions 132 and circular bottoms 133 which close ends of the wall portions 132. The recessed portions 131 project in an opposite side to the surface members 14, and correspond to the projections 12. The surface members 14 are airtight. The surface members 14 cover the recessed portions of the core members 13, thereby sealing the recessed portions 131 and forming airtight spaces.

The recessed portions 131 of the intermediate members 21 and 22 are formed at positions corresponding to each other. That is, centers of the recessed portions 131 of the intermediate members 21 correspond to centers of the recessed portions 131 of the intermediate members 22. End surfaces of the bottoms 133 of the recessed portions 131 are in contact with each other and are fixed by bonding or fusion.

The core members 13 of the intermediate members 21 and 22 are made from a low-weight plastic with high rigidity and through which light can pass, and the surface members 14 are made from plastic through which light can pass.

The illuminator 30 includes a number of LEDs 31 provided between the intermediate members 21 and 22, and a control device 32 which controls brightness, illumination duration, and illumination on-off intervals of the LEDs 31.

The LEDs 31 includes, for example, red LEDs, blue LEDs, and white LEDs. Light emitted from the LEDs 31 is transmitted through the core members 13 and the surface members 14, and goes out of the honeycomb structure structural board 1.

The control device 32 selects only the LEDs having a specified color out of the LEDs 31, and controls the brightness, the illumination duration, and the illumination on-off interval to inform passengers of information regarding operations of trains.

Specifically, all of the honeycomb boards 1 which constitute the floor 64 emit light, and actions of the train 60, such as acceleration, deceleration, and stopping, are shown by the lighting of the entire floor 64. In the floor 64, floor areas 64A are portions in front of the doors 62. Only the floor areas 64A corresponding to the doors 62 which will be opened at a next stop, emit light. Thus, at every station, the doors 62 which will open and which will be closed, are indicated.

The embodiment has the following effects.

(1) Because the intermediate members 21 and 22 are formed by a honeycomb structure of the base members 11 and the projections 12 which reduces its weight, and because combinations of the intermediate members 21 and 22 of the honeycomb structure increases its rigidity, the high rigidity and low weight of the honeycomb structure structural board 1 are achieved.

The light from the illuminator 30 is transmitted through the intermediate members 21 which are light permeable, and exits the honeycomb structure structural board 1. Therefore, when the honeycomb structure board 1 is used as the floor of the train 60, the feet of the passengers are more brightly lit than by the illumination from the ceiling alone.

The light from the illuminator 30 is refracted, reflected, and dispersed by the projections 12, is then transmitted through the base member 11, and then exits the honeycomb structure structural board 1. Therefore, appearance of the honeycomb structure structural board is improved, and its design value is enhanced.

(2) Because the intermediate members 21 are formed by covering the surfaces of the uneven core members 13 with the flat surface members 14, a number of airtight spaces are provided between the recessed portions 131 of the core members 13 and the surface members 14, thereby improving strength against external forces and thermal insulation.

(3) Because the core members 13 are made of low-weight plastic with high rigidity and the surface members 14 are made of plastic, the weight of the honeycomb structure structural board 1 can be reduced.

(4) By the changes in color, brightness, illumination duration, and the illumination on-off interval of the entire floor 64, the actions of the train 60, such as acceleration, deceleration, and stopping, are indicated. Therefore, the passengers can move to appropriate postures depending on the actions. By the illumination of the floor 64A corresponding to the doors 62 which will open at the next stop, the passengers can know which doors 62 will open at the stops, and can smoothly get off.

Although in the embodiment the surface members 14 are made of plastic, the present invention is not limited to this, and the surface members 14 may be formed of glass.

In addition to the effects (1), (2), and (4), the present invention has the following effect.

(5) When the surface members 14 are made of glass, light penetration ability is improved, and the brightness of the honeycomb structure structural board 1 is increased.

Second Embodiment

Figure 4:
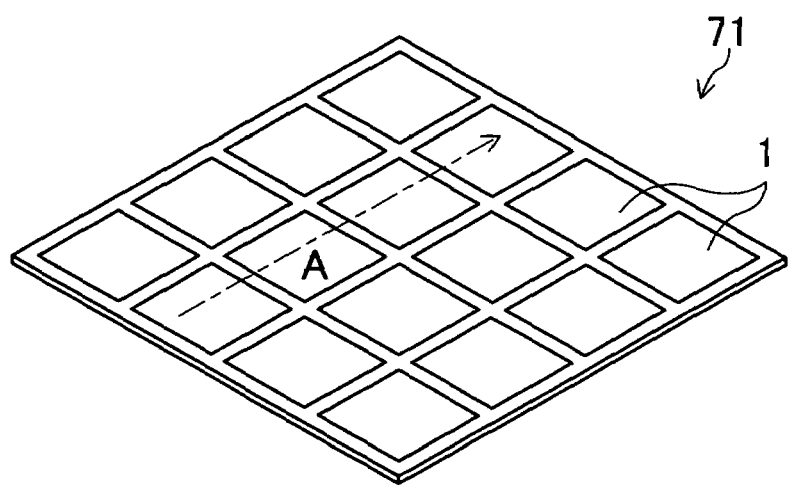
FIG. 4 is a perspective view showing a passage in a building to which a structural board of a second embodiment of the present invention is applied.

FIG. 4 is a perspective view of a passage 71 in a building using the honeycomb structure structural board 1 of the second embodiment of the present invention.

This embodiment differs from the first embodiment in that the honeycomb structure structural board 1 is used in the passage 71 of a building.

The passage 71 in the building is constituted by a number of the honeycomb structure structural boards 1. In case of fire, the illuminators 30 inform people of the locations of emergency exits and directions of evacuation. When the fire occurs, in a direction A in FIG. 4, a number of the honeycomb structure structural boards 1 is turned on one by one, to inform people of the location of the emergency exit in the direction A and of the direction in which people should evacuate.

In addition to the effects (1) to (4), the second embodiment has a further effect:

(6) By the changes in brightness, illumination duration, and illumination on-off interval of the illuminators 30, the direction A is indicated, and the location of the emergency exit and the direction of evacuation are indicated. Therefore, people can be reliably guided to the emergency exits.

Third Embodiment

Figure 5:
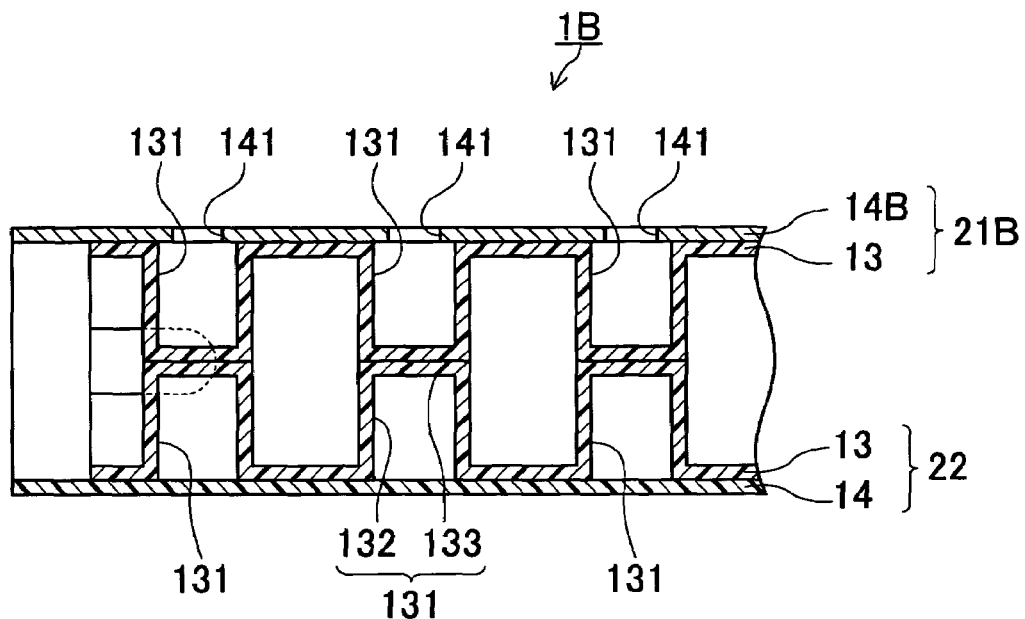
FIG. 5 is a cross-sectional view of a structural board of a third embodiment of the present invention.

FIG. 5 is a cross-sectional view of the honeycomb structure structural board 1B of the third embodiment.

In the third embodiment, surface members 14B of intermediate members 21B differ from those in the first and second embodiments.

The surface members 14B are punched metal plates having a number of holes 141. The holes 141 of the surface member 14B are positioned between the recessed portions 131 of the core member 13. The surface member 14B seals the recessed portions 131.

In addition to the above-described effects (1), (2), (4), and (6), the third embodiment has the following effect.

(7) Because the surface member 14B of the intermediate member 21B is the punched metal plate, resistance to shock and abrasion of structure board 1B are improved.

Fourth Embodiment

Figure 6:
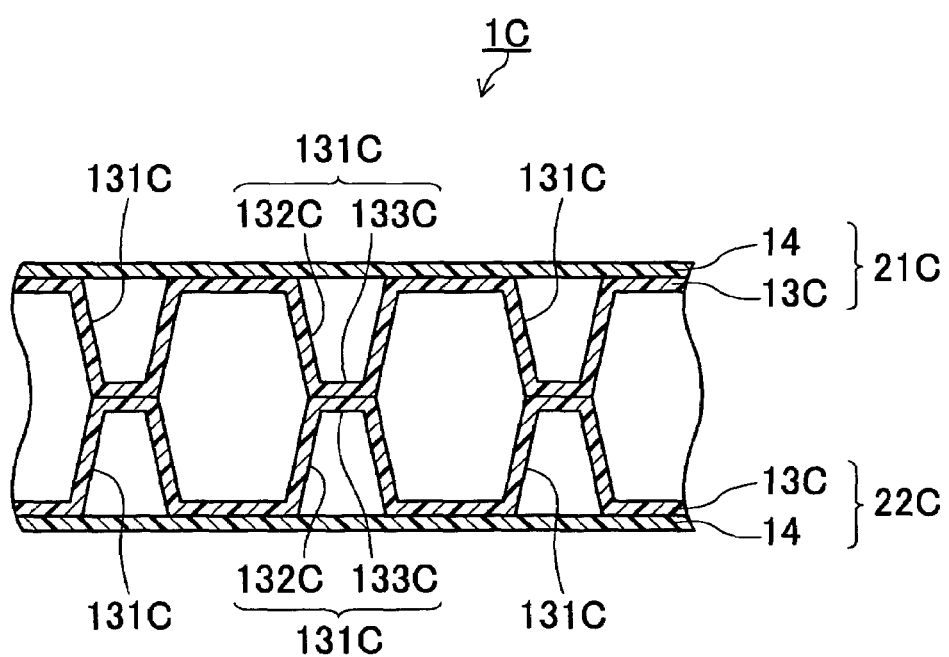
FIG. 6 is a cross-sectional view of a structural board of a fourth embodiment of the present invention.

FIG. 6 is a cross-sectional view of the honeycomb structure structural board 1C of the fourth embodiment of the present invention.

Shapes of recessed portions 131C of intermediate members 21C and 22C differ from those of the first and second embodiments.

The recessed portions 131C of core members 13C of the intermediate members 21C and 22C include conical wall portions 132C which become narrower toward their ends and circular bottoms 133C which close the ends of the wall portions 132C.

The fourth embodiment has effects similar to (1) to (6) described above.

Fifth Embodiment

Figure 7:
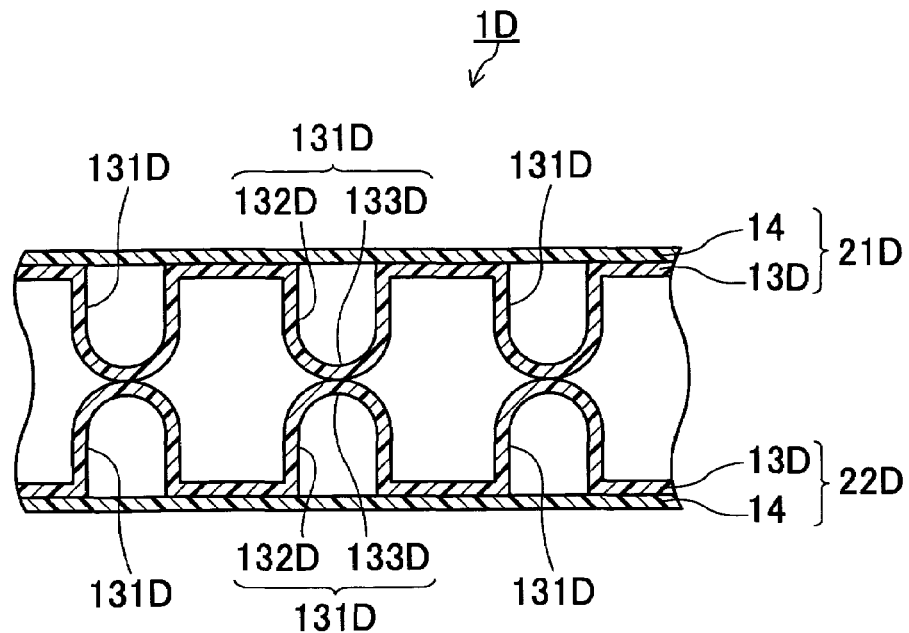
FIG. 7 is a cross-sectional view of a structural board of a fifth embodiment of the present invention.

FIG. 7 is a cross-sectional view of the honeycomb structure structural board 1D of the fifth embodiment of the present invention.

Shapes of recessed portions 131D of intermediate members 21D and 22D of the fifth embodiment differ from those in the first and second embodiments.

The recessed portions 131D includes cylindrical wall portions 132D, and hemisphere bottoms 133D which close ends of the wall portions 132D.

The fifth embodiment has effects similar to (1) to (6) described above.

Sixth Embodiment

Figure 8:
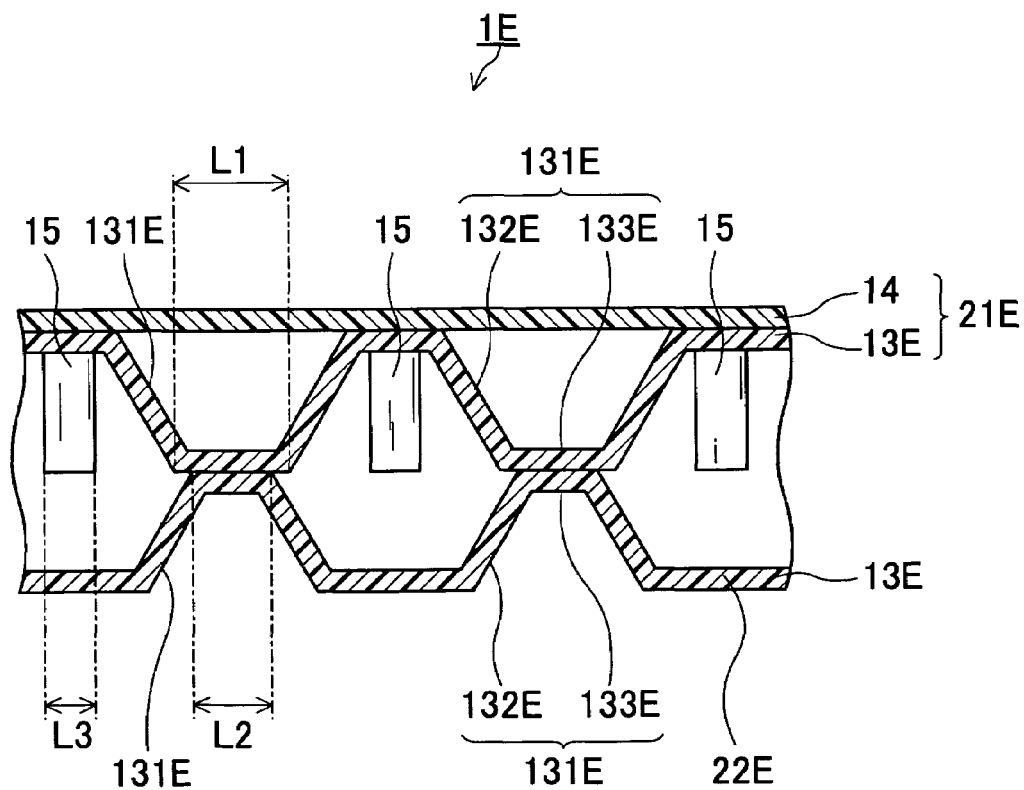
FIG. 8 is a cross-sectional view of a structural board of a sixth embodiment of the present invention.

FIG. 8 is a cross-sectional view of honeycomb structure structural board 1E of the sixth embodiment of the present invention.

The sixth embodiment differs from the first and second embodiments in that recessed portions 131E of intermediate members 21E and 22E have different shapes, in that sub-projections 15 are provided on a core member 13E of intermediate member 21E, and in that surface members are removed from the intermediate member 22E.

The recessed portions 131E of the core member 13E include conical wall portions 132E which become narrow toward their ends and circular bottoms 133E which close the ends of the wall portions 132E.

The recessed portions 131E of the intermediate member 21E are greater than the recessed portions 131E of the intermediate member 22E. Specifically, a diameter of the bottoms 133E of the recessed portions 131E of the intermediate member 21E is L1, and a diameter of the bottoms 133E of the recessed portions 131E of the intermediate member 22E is L2, which is smaller than L1.

The sub-projections 15 are provided on the core member 13E of the intermediate member 21E. The sub-projections 15 are provided between the neighboring recessed portions 131E of the core member 13E. The sub-projections 15 have a cylindrical shape which extends toward the base member 11 of the intermediate member 22E, and a diameter of the sub-projections 15 is L3, which is smaller than L2.

The intermediate member 22E has no surface member, and the core member 13E is exposed. Thus, sound absorption effects of the intermediate member 22E are improved.

The sixth embodiment has effects similar to (1) to (6) described above.

An operation of the above-described honeycomb structure structural board 1E will be explained.

When a shock is given to a honeycomb structure structural board 1E, the recessed portions 131E which are in contact with each other are deformed so as to absorb the shock. Then, as the deformation progresses, the ends of the sub-projections 15 come into contact with the core member 13E of the intermediate member 22E so that the shock can be further absorbed.

Because the diameter L3 of the sub-projections 15 is smaller than L2, the sub-projections 15 can be efficiently arranged between the neighboring recessed portions 131 of the core member 13E of the intermediate member 21E.

Because the diameter L2 of the bottoms 133E of the intermediate member 22E is smaller than L1, even when a shock is given to the honeycomb structure structural board 1E, the recessed portions 133E of the intermediate member 22E can be easily deformed, and the shock absorbing effect can be improved.

In addition, the sixth embodiment has effects similar to (1) to (6) described above.

Seventh Embodiment

Figure 9:
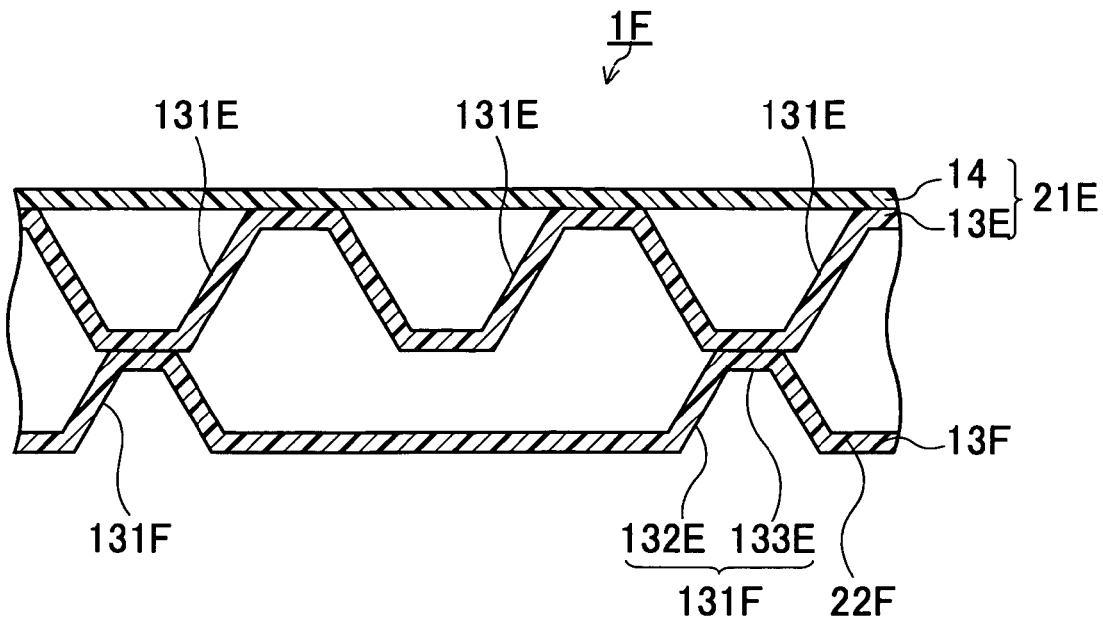
FIG. 9 is a cross-sectional view of a structural board of a seventh embodiment of the present invention.

FIG. 9 is a cross-sectional view of a honeycomb structure structural board 1F of the seventh embodiment of the present invention.

The seventh embodiment has a different structure of an intermediate member 22F from that in the sixth embodiment.

Recessed portions 131F of a core member 13F of the intermediate members 22F has the same shape as that of the recessed portions 131E of the sixth embodiment. A distance between the recessed portions 131F is twice that in the sixth embodiment. Therefore, some of the recessed portions 131E of the intermediate member 21E are in contact with the recessed portions 131F of the intermediate member 22F, and other recessed portions 131E of the intermediate member 21E achieve similar functions to those of the sub-projections 15 in the sixth embodiment.

The seventh embodiment has effects similar to (1) to (6) described above.

Eighth Embodiment

Figure 10:
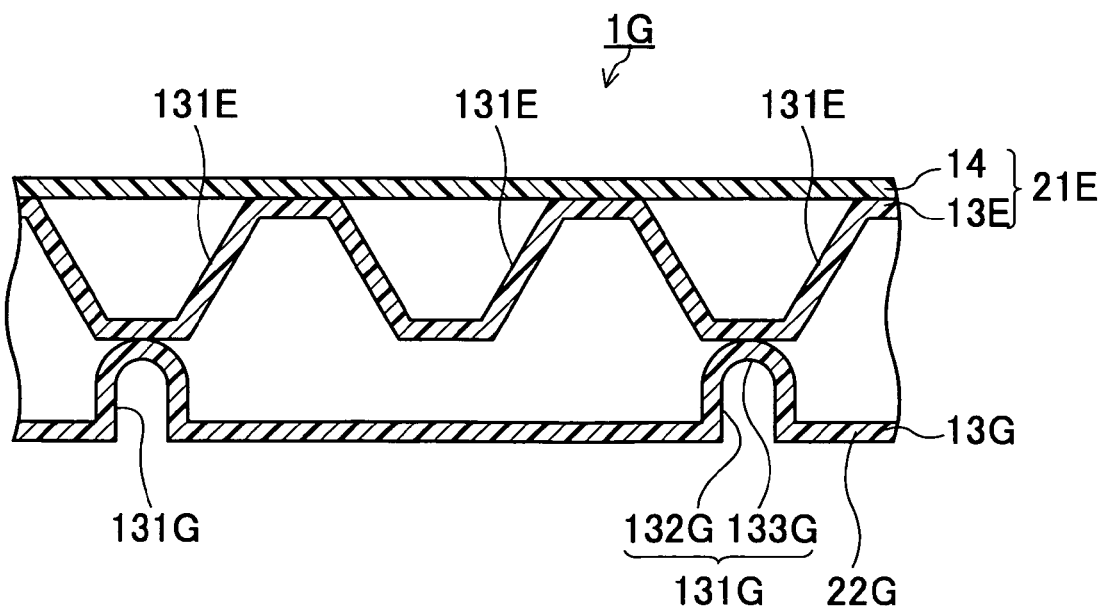
FIG. 10 is a cross-sectional view of a structural board of an eighth embodiment of the present invention.

FIG. 10 is a cross-sectional view of a honeycomb structure structural board 1G of the eighth embodiment of the present invention.

The eighth embodiment has a different structure of an intermediate member 22G from that in the sixth embodiment.

Recessed portions 131G of a core member 13G of the intermediate member 22G includes cylindrical wall portions 132G, and hemisphere bottoms 133G which close ends of the wall portions 132G. A distance between the recessed portions 131G of the intermediate member 22G is twice the distance between the recessed portions 131E of the sixth embodiment. Therefore, some of the recessed portions 131E of the intermediate member 21E are in contact with the recessed portions 131G of the intermediate members 22G, and other recessed portions 131E of the intermediate member 21E achieve similar functions to those of the sub-projections 15 in the sixth embodiment.

The eight embodiment has effects similar to (1) to (6) described above.

While preferred embodiments of the invention have been described and illustrated above, it should be understood that these are exemplary of the invention and are not to be considered as limiting. Additions, omissions, substitutions, and other modifications can be made without departing from the spirit or scope of the present invention.

For example, while the honeycomb structure structural boards 1 to 1G are used in a train 60 and a passage 71 of a building, the present invention is not limited to these embodiments, and it may be applied to floors of automobiles and ships, etc. The present invention can be applied not only to floors but also to ceilings.

The recessed portions 131 to 131G, which are circular in plan view in the above embodiments, may be polygonal.

While in the above embodiments the centers of the recessed portions 131 to 131E of the intermediate members 21 to 21E correspond to the centers of the recessed portions 131 to 131G of the intermediate members 22 to 22G, the centers may be slightly off-axis.

What is claimed is:

1. A structural board comprising:
a pair of intermediate members each comprising a core member that has a plurality of hollow projections, and a flat surface member laid on the core member, the intermediate members being positioned in parallel, wherein the surface member is a punched metal plate having a plurality of holes, each hole being aligned with a hollow projection of the core member, the hollow projections of the plurality of hollow projections being in contact with each other at their respective ends in a direction perpendicular to the intermediate members, at least one of the intermediate members being light permeable; and
an illuminator provided between the intermediate members.

2. A structural board according to claim 1, wherein the core member is made of lightweight rigid plastic.

3. A structural board according to claim 1, further comprising a controller for controlling at least one of a color, brightness, time, and on-off interval of light from the illuminator.

4. A structural board according to claim 1, wherein spaces present in the projections are airtight.

* * * * *